Nov. 3, 1970  R. A. WALLIN  3,537,124
DEVICE FOR REMOVING MOLTEN SOLDER FROM SOLDERED JOINTS
Filed Feb. 26, 1968
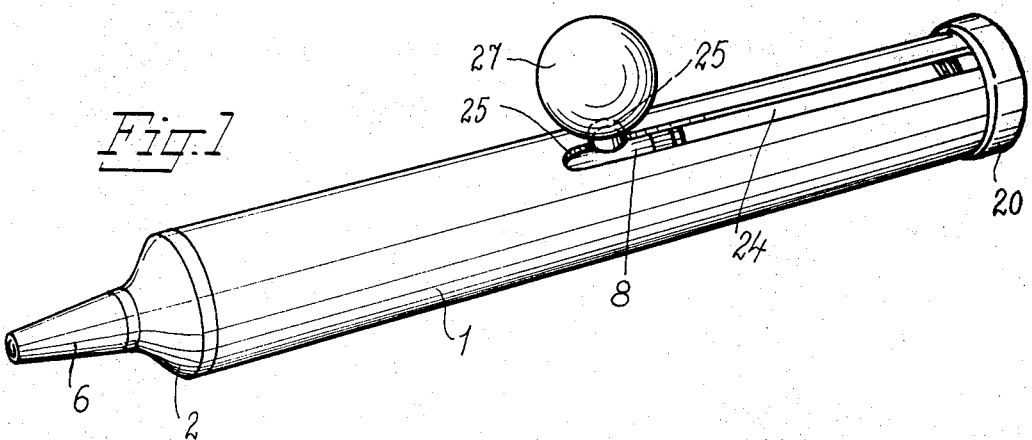
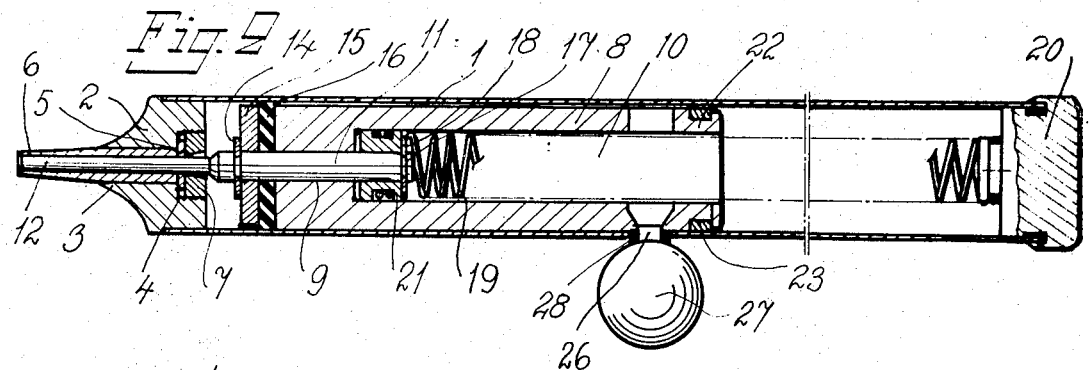
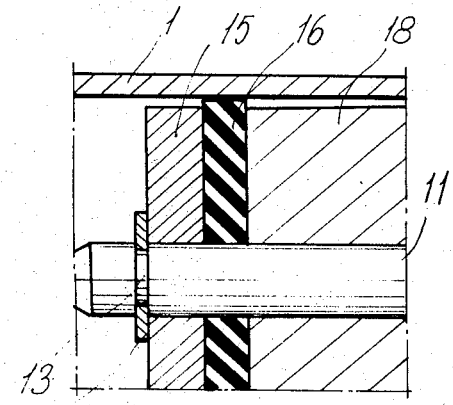
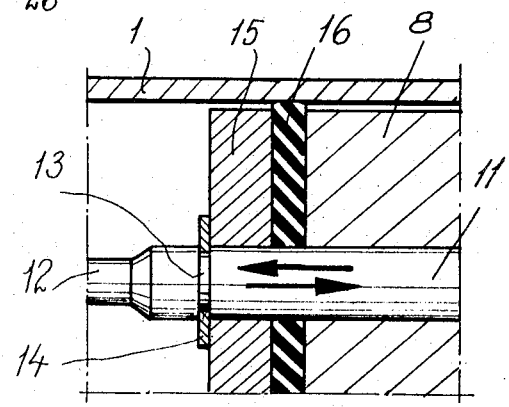
INVENTOR
Rolf Alexander Wallin
BY Eric G. Greenson
ATTORNEY United States Patent Office 3,537,124
Patented Nov. 3, 1970

3,537,124
DEVICE FOR REMOVING MOLTEN SOLDER
FROM SOLDERED JOINTS
Rolf Alexander Wallin, Vasavagen 21a,
Jakobsberg, Sweden
Filed Feb. 26, 1968, Ser. No. 708,158
Claims priority, application Sweden, Mar. 17, 1967,
3,725/67
Int. Cl. A47l 5/02
U.S. Cl. 15—341            5 Claims

ABSTRACT OF THE DISCLOSURE

A device for drawing off molten solder from soldered joints comprising a cylinder in which a plunger is displaceable through a suction stroke by a tension spring to produce suction in one end portion of the cylinder so that the molten tin to be removed can be drawn into the cylinder through a nozzle connected to the end of the cylinder. The plunger is manually displaced against the force of the tension spring by means of a knob which is secured to the side of the plunger and projects laterally through a longitudinal slot in the cylinder.

---

This invention relates to a device for drawing off molten solder from soldered joints.

A known device for this purpose comprises a hollow cylinder which is provided with a nozzle at one end and in which a plunger is displaceable rearwardly away from the nozzle end by a tension spring to produce suction in the nozzle. The plunger is manually displaceable forwardly to a forward position in which it can be mechanically locked and then released to permit the tension spring to displace it rearwardly. The piston is displaced forwardly by means of an operating member which is constituted by a rod secured to and extending rearwardly from the plunger and projecting from the rear end of the cylinder. The rearwardly extending rod required that the operator uses both hands to displace the plunger forwardly and, moreover, it makes it difficult to handle the device in confined spaces, since the length of the device is nearly doubled when the plunger and the rod are fully displaced rearwardly. Furthermore, the rapid rearward displacement of the rod can cause injuries to the operator, particularly his face, and damage the operator's glasses or the equipment being worked on.

It is an object of the present invention to provide an improved device of the class described wherein the above-mentioned drawbacks are substantially eliminated.

According to the invention the manually operable operating member of the plunger projects laterally outwardly from the plunger through a longitudinally extending slot in the cylinder, so that the displacement of the piston and the operating member does not affect the overall lentgh of the device.

In a preferred embodiment of the invention a resilient sealing member is disposed at the forward end of a plunger body and a compression member is connected with the tension spring to axially compress the sealing member against the plunger body to cause it to expand radially and engage the inner wall of the cylinder. In this embodiment a particularly strong suction is achieved, primarily because the sealing member is always axially compressed and, accordingly, radially expanded during the movement of the plunger, irrespectively whether the plunger is displaced rearwardly for drawing in solder or forwardly against the force of the tensile spring. In the latter case the sealing member, by virtue of its engagement with the cylinder wall, prevents drawn-in solder particles from penetrating between the cylinder wall and the plunger, thereby causing friction. The foregoing sealing arrangement gives full sealing action already at the commencement of the suction stroke since the sealing action is not dependent on the development of vacuum in front of the plunger.

In the preferred embodiment the plunger includes an axially extending rod which is axially movable a limited distance in the plunger. Adjacent its forward end the rod is provided with a collar for limiting the rearward axial movement and at its rear end the rod is connected to the tension spring. The sealing member and the compression member are disposed between the collar and the forward end face of the body of the plunger. Thus the tension spring acts on the compression member through the rod and the collar to pull the compression member rearwardly against the sealing member and the body of the plunger. Preferably the plunger is provided with two axial bores connected to each other, viz. a narrow one in the forward portion of the plunger, in which bore the rod is located, and a wider one in the rear portion, in which bore the forward portion of the tension spring is located and connected to the rear end of the rod. When the plunger is fully displaced rearwardly the tension spring is entirely within the wider bore.

Other features and advantages will become apparent from the following description of an embodiment of the device according to the invention with reference to the accompanying drawing.

FIG. 1 is a perspective view of the device with the plunger displaced to the forward position;

FIG. 2 is a view in longitudinal section of the device;

FIG. 3 is a fractional view in longitudinal section of the plunger with the sealing member relieved from the axially compressing force;

FIG. 4 is a fractional view similar to FIG. 3 with the sealing member axially compressed by the force of the tension spring.

With reference to the drawing, the device comprises a tubular cylinder 1 in the forward end of which a nozzle 2 is secured. The nozzle is provided with a through-bore 3 the rear portion of 4 of which is widened so that a shoulder is formed. A flange 5 of a tubular inner nozzle member 6 of a plastic material, such as polytetrafluorethene, is clamped against the shoulder by means of a threaded plug 7 in the widened portion 4 to secure the inner nozzle member in position.

A plunger which is displaceable in the cylinder 1 comprises a plunger body 8 which is provided with a forward, relatively narrow bore 9 and a rear, wider bore 10. In the forward bore 9 there is slidably disposed a rod 11 having a forwardly directed reduced extension 12 fitting in the bore of the inner nozzle member 6. Adjacent its forward end the rod 11 is provided with an annular groove 13 in which a groove runner 14 is inserted. The groove runner forms a collar which normally engages one face of a compression disk 15 the opposite face of which engages a resilient sealing disk 16. Adjacent its rear end the rod 11 is provided with an annular groove 17 in which a retaining member 18 is inserted. Between the retaining member 18 and the shoulder formed by the two bores 9 and 10 the rod carries a rotatable attachment member 21 by way of which the forward end of a tension spring 19 is connected to the rod. The rear end of the tension spring 19 is connected to an end cap 20 which is screwed into the rear end of the cylinder. The length of the rod between the groove runner 14 and the retaining member 18 slightly exceeds the combined length of the disks 15 and 16, the bore 9 and the spring attachment member 21 so that the rod 11 can perform a limited axial movement.

Adjacent its rear end the plunger body 11 is provided with an annular groove 22 in which a guide ring 23 is fitted. The rear portion of the cylinder 1 is provided with a longitudinally extending slot 24. A lateral extension 25 of the forward end of the slot 24 serves for the purpose of holding the plunger arrested in the forward position thereof as shown in FIGS. 1 and 2. The plunger body 8 is provided with an operating member which extends laterally from the plunger body through the slot 24. The operating member comprises a short pin 26 which is screwed into the plunger body and provided with a knob in the form of a ball 27. To reduce the friction between the operating member and the edges of the slot 24 a ring 28 of a material having a low coefficient of friction is rotatably mounted on the pin 26.

The device is made ready for a solder-drawing operation by displacing the plunger by means of the operating member to the forward position and then inserting the operating member in the lateral extension 25 of the slot 24 so that the plunger is retained in the forward position as shown in FIGS. 1 and 2. The nozzle of the device can now be moved to the location from which molten solder is to be drawn, and when the operating member is released from the extension 25 the tension spring 19 rapidly moves the plunger rearwardly so that the solder is drawn into the cylinder through the nozzle.

Any solder particles remaining in the bore of the nozzle are removed by the extension 12 of the rod 11 when the plunger is moved forwardly. In order that the solder particles may be completely pushed out of the nozzle bore the lateral extension 25 of the slot 24 is dimensioned so as to allow the plunger to be moved a short distance beyond the forward position so that the forward end of the extension 12 reaches and possibly passes the forward end of the nozzle bore.

While only one embodiment of the invention is shown and described, it is obvious that the invention is not limited to that embodiment but several modifications may be made within the scope of the annexed claims.

What I claim is:

1. A device for removing molten solder from a soldered joint comprising, a cylinder assembly including a tubular cylinder, a nozzle secured to one end of the cylinder, an end cap at the opposite end of the cylinder and a plunger reciprocable in the cylinder, said plunger including an axially-extending rod axially movable for a limited distance in the plunger body and provided adjacent to the forward end thereof with a collar and connected at the rear end thereof to the forward end of an axially-extending tension spring, forming a spring means, and with a sealing and compression member being disposed between said collar and the forward end face of said plunger body.

2. A device as set forth in claim 1 wherein said plunger body is provided with a first axial bore in the forward portion thereof, said rod being located and axially guided in said first bore, and a second axial bore in the rear portion thereof, said first and second bores being connected to each other and said second bore being substantially wider than said first bore and housing the forward portion of said axially extending tension spring.

3. A device as set forth in claim 2 wherein the rear end of said rod projects rearwardly into said second bore and carries a spring attachment member to which the forward end of said tension spring is attached, said spring attachment member being adapted to engage a rearwardly facing shoulder formed in said plunger body by said first and second bores.

4. A device as set forth in claim 3 wherein said rod is rotatable in said plunger body, said end cap is screwed into the bore of said cylinder, and the rear end of said tension spring is attached to said end cap.

5. A device as set forth in claim 1 wherein said nozzle comprises a metal outer member, which is sealingly attached to said cylinder, and a tubular inner member disposed in a bore in said outer member, said inner member consisting of plastic material and being interchangeably secured to said outer member by means of a threaded plug screwed into said outer member.

References Cited

UNITED STATES PATENTS

| 1,142,023 | 6/1915 | Chott | 230—219 X |
| 3,337,897 | 8/1967 | Lerner et al. | 15—341 |
| 2,276,098 | 3/1942 | Saunders | 128—300 |
| 2,958,445 | 11/1960 | Jesse | 222—386 |

FOREIGN PATENTS

| 1,448,002 | 6/1966 | France. |

ROBERT W. MICHELL, Primary Examiner

U.S. Cl. X.R.

15—344